S. E. WINDER.
NESTING MACHINERY.
APPLICATION FILED APR. 3, 1915.
1,207,257.
Patented Dec. 5, 1916
4 SHEETS—SHEET 1.
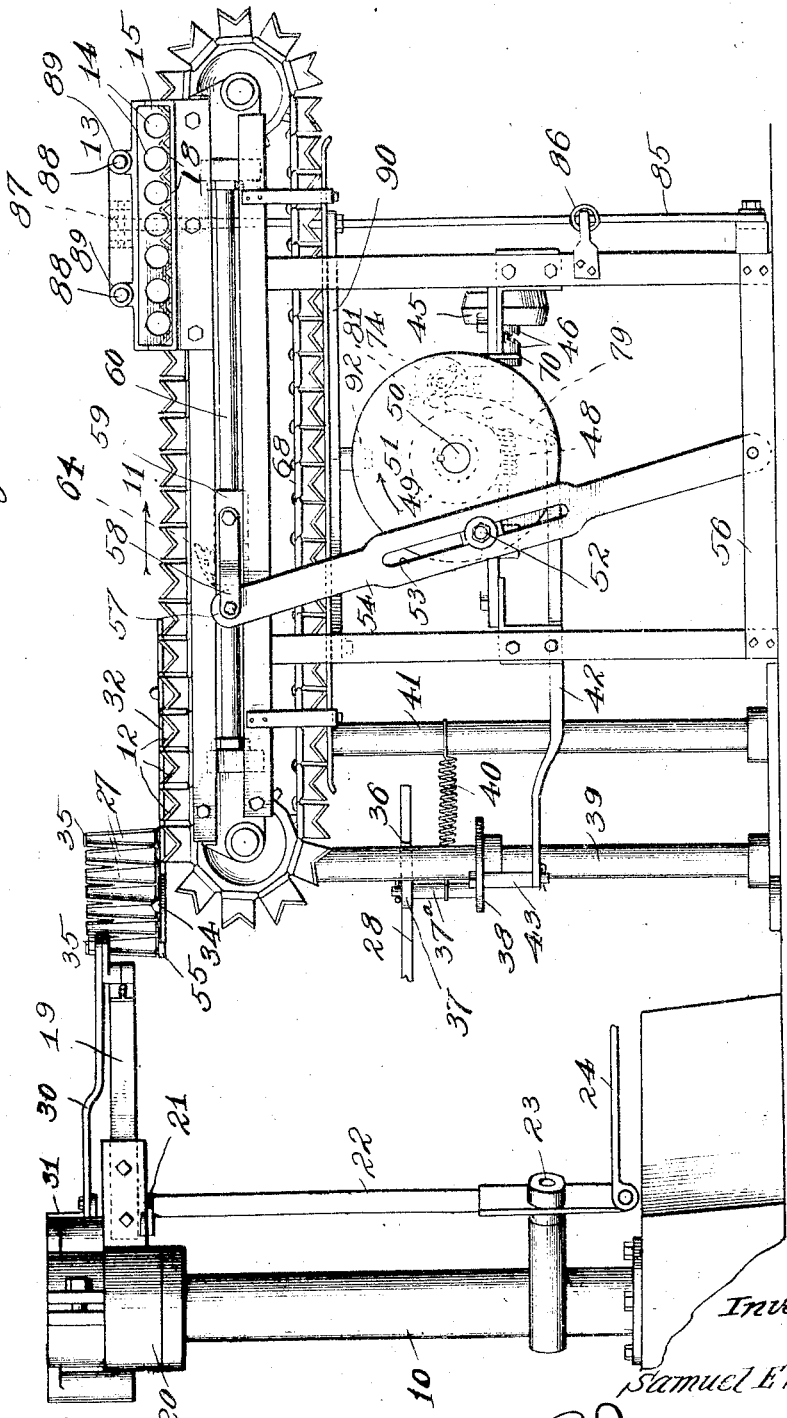
Witness
Inventor
Samuel E. Winder
E. J. Andrews
Atty.

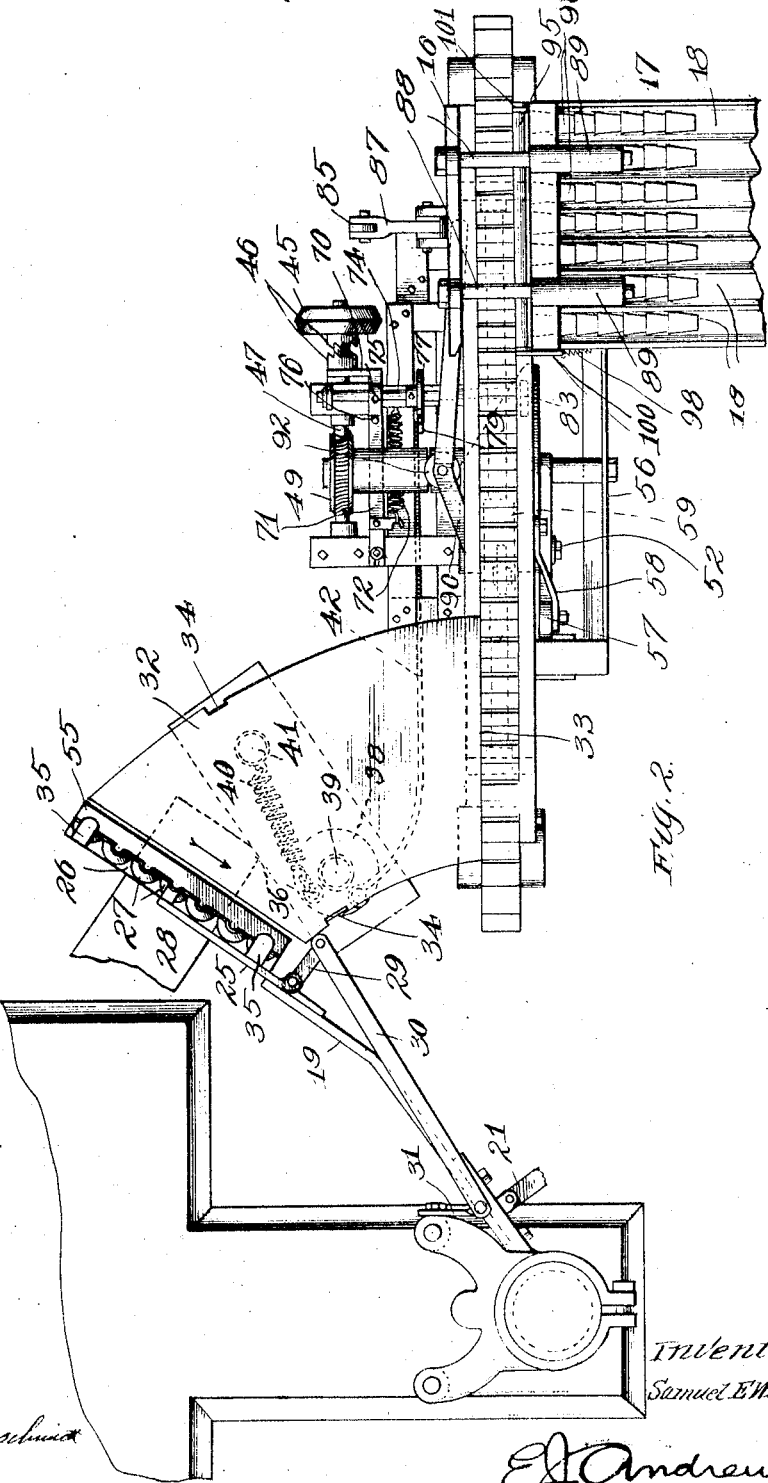

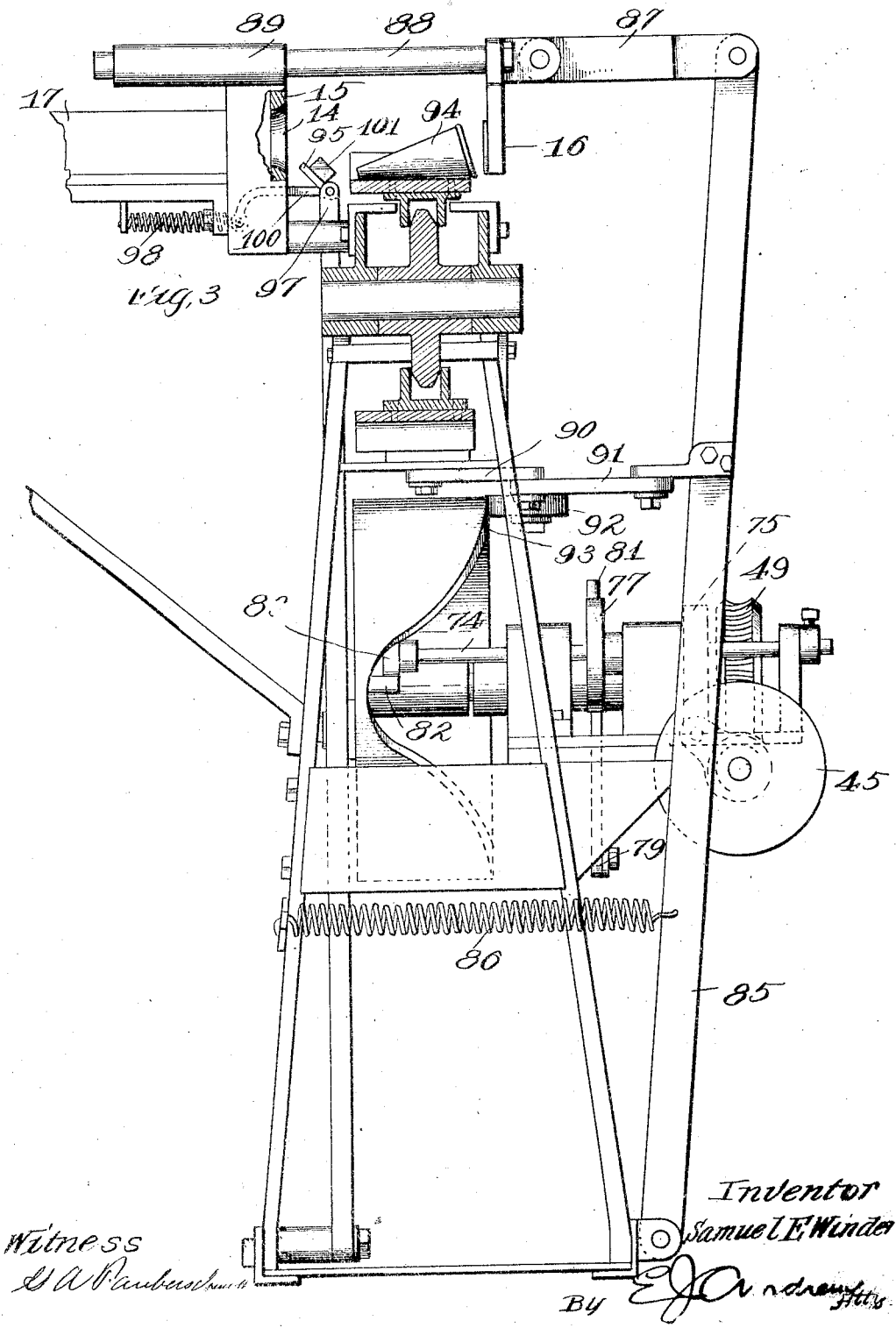

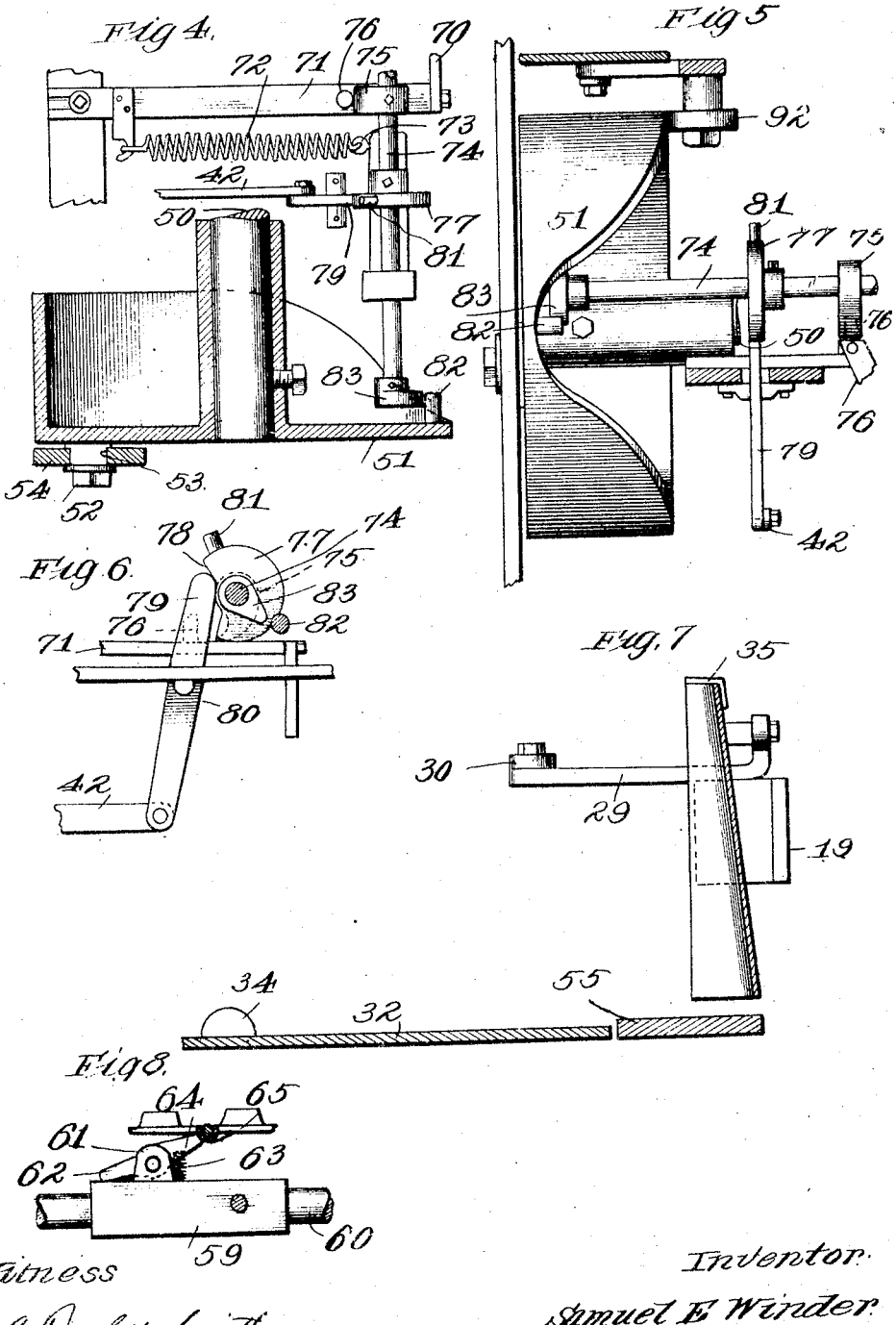

UNITED STATES PATENT OFFICE.

SAMUEL E. WINDER, OF CHICAGO, ILLINOIS, ASSIGNOR TO CONSOLIDATED WAFER COMPANY, OF BROOKLYN, NEW YORK, A CORPORATION OF NEW YORK.

NESTING MACHINERY.

1,207,257.  Specification of Letters Patent.  Patented Dec. 5, 1916.

Application filed April 3, 1915. Serial No. 18,886.

*To all whom it may concern:*

Be it known that I, SAMUEL E. WINDER, a citizen of the United States, residing at Chicago, in the county of Cook and State of Illinois, have invented certain new and useful Improvements in Nesting Machinery, of which the following is a specification.

This invention relates to machinery to be used for the purpose of nesting containers of various sorts, and more particularly for use in nesting ice cream cones as they are delivered by the cone molding and baking machinery, so that the cones may be more quickly and conveniently handled, wrapped and boxed.

One of the objects of my invention is to produce suitable mechanism for receiving the cones from the baking machinery and delivering them, in a suitable manner, to the nesting machine as rapidly as the cones are baked.

A further object of my invention is to provide means for trimming the edges of the cones, thus removing superfluous pieces of the baked batter, and at the same time for separating from each other the cones of the blocks.

A further object of my invention is to provide means for nesting the cones together in bunches in such a manner that no injury will result to the cones by the handling, and so that the cones will be in proper condition for wrapping and boxing.

Other objects of my invention will be apparent from a consideration of the accompanying drawings and the description thereof hereinafter set forth.

Figure 1 of the drawings is an elevation of a machine embodying the features of my invention showing its relation to the molding and baking machine with which it coöperates. Fig. 2 is a plan view of the same. Fig. 3 is an enlarged end view of the machine. Figs. 4, 5, 6, 7, and 8 are enlarged detail views of certain features of the machinery.

In Patent No. 1,119,918, issued in my name on the 8th day of December 1914, is given a full description of an ice cream cone molding and baking machine with which my nesting machine is adapted to coöperate; and reference may be had to this patent for a fuller understanding of the molding and baking machine than is disclosed herein.

The cone molding and baking machine comprises a main support 10 for the turntable of the machine. The turntable is intermittently rotated by suitable means, making 12 stops in one revolution. At each stop of the machine, a block of cones, comprising seven individual cones connected by the baked batter into a block, are delivered by the baking machine to the nesting machine. These cones are received by the nesting machine, in a manner hereinafter described, and are delivered onto the conveyer 11, each cone resting in one of the triangular or cup-shaped buckets 12. This conveyer is operated in a manner hereinafter described, and the cones are carried in the direction of the arrow by the intermittent movement of the conveyer. The block of cones is received by the conveyer during one of its stops; the conveyer then moves forward a distance equal to the width of seven buckets, so as to make room for the reception of a new block of cones, and the conveyer then again comes to rest and allows sufficient time for the cones to cool to the proper temperature. The operating mechanism then carries the cones forward on the conveyer a similar distance farther bringing them in front of the separating, trimming, and nesting mechanism 13, at the outer end of the conveyer.

The separating and trimming mechanism comprises a series of apertures 14 in a die plate 15 through which the cones are forced by means of the plunger plate 16, which is operated as hereinafter described. As the cones are forced through the apertures, the edges of the cones are suitably trimmed and at the same time the cones are separated from each other. After passing through the trimming apertures, the cones are deposited upon the nesting table 17, each cone resting in one of the grooves 18 of the table. When the block of cones is forced through the trimming plate the small ends of the cones pass into the large ends of the preceding cones, and the two sets of cones are pushed snugly together. This process is repeated, one set of cones being pushed into the preceding set, until a sufficient number have accumulated, when they are removed manually and properly disposed of by wrapping and boxing.

When the machine is in condition to receive a block of cones from the baking machine the various members of the machine are in the positions indicated in Figs. 1 and 2. The cone receiving lever 19 is pivoted to the support 10, being fixed to the collar 20 which is rotatably mounted on the support. Pivoted to the lever 19 is a link 21, which is pivoted at its other end to the upper end of a lever 22. This lever is pivoted to the frame of the baking machine on a rod 23, and is intermittently reciprocated in a suitable manner by the mechanism of the baking machine by means of the connecting rod 24. Pivoted to the outer end of the lever 19 is a bell crank lever 25, which supports the frame 26. This frame supports cups 27, each of these cups being adapted to receive a cone from the baking machine.

The cone baking machine delivers a block of cones from a mold fixed to the platform 28 which is brought to rest immediately beneath the frame 26, and suitable mechanism of the baking machine comprising the plate 55 elevates the cones into position for reception by the cups 27. As the delivery of the block of cones in this manner and the operation of the lever 19 forms no part of this invention I have omitted the operating mechanism therefor from the drawings, and this description, and a fuller understanding thereof, may be had by reference to said Patent No. 1,119,918, wherein the elevating plate, corresponding to plate 55 herein, is also indicated by the numeral 55.

In order to properly deliver the cones to the conveyer 11 I connect the short arm 29 of the bell crank, by means of a link 30, to a member 31, immovably fixed to the baking machine, so that, as the lever 19 moves forwardly, the connecting rod 30 will operate the bell crank with reference to the lever 19, so as to move the cups carrying the cones a material distance farther than would result with the lever 19 alone.

When the cones are elevated, by the plate 55 of the baking machine mechanism, in front of the cups 27, the lever 19 is moved forwardly, and the cups 27 sweep the cone block from the plate 55 onto and across the shelf 32; and the adjustment of the compound lever is such that the cups come to rest when the block of cones projects a material distance beyond the edge 33 of the shelf. The block then tips forward by the action of gravity and falls onto the conveyer, each cone resting in a bucket 12. The receiving cups are then restored to their original positions by the backward movement of the lever 19.

Fixed to the table 32 are knives 34 positioned a distance apart equal to the length of a block of cones. The block of cones while being transmitted to the conveyer passes along the table between these knives and the outer edges of the block are trimmed of any superfluous batter. In order to prevent the knives from elevating the blocks, particularly the outer cones of the blocks, I provide the stops 35, which are respectively fixed immediately over the upper ends of the end cups, so that the cones in these cups are elevated against the stops and are thus prevented from being lifted by the knives.

As the cones are moving forward along the shelf 32 the platform 28 is moved in the direction of the arrow by the operating mechanism of the baking machine, and this platform by its movement provides for the operation of the mechanism of the nesting machine. As the platform moves the forward corner 36 thereof comes in contact with the roller 37 rotatably mounted on a stud 37ª fixed to a disk 38 which is rotatably mounted on the support 39 of the nesting machine; and the platform thus imparts a limited rotating movement to the disk. The disk 38 as it rotates extends a spring 40 which connects the pin 37ª with the support 41 and the energy thus stored in the spring tends to return the disk to the original position. Also as the disk rotates under the action of the platform, bar 42, by means of the stud 43, is moved to the right; and this bar sets in motion the operating mechanism of the nesting machine in a manner hereinafter described.

The various details of the operating mechanism of the nesting machine are as follows: The machine is operated by means of the driving pulley 45 which is continuously rotating at constant speed. A clutch 46 is positioned between the driving pulley 45 and the mechanism of the machine, being rotatably mounted on the shaft 47 of the driving pulley. Mounted on the shaft 47 is a worm 48 which coacts with the worm gear 49 mounted on the shaft 50 and fixed thereto. Fixed to the shaft 50 is a cam disk 51. A pin 52, adjustably fixed near the periphery of the disk 51, passes through a slot 53 of a lever 54. This lever is pivoted to the bar 56 of the frame of the nesting machine. The free end 57 of the lever 54 is connected, by means of a link 58, to a member 59, which is slidably mounted on guide bars 60. As the disk 51 rotates, when clutch 46 is in action, lever 54 will be reciprocated, and the member 59 will be thus reciprocated forward and backward on the guide bars 60.

Projecting from the upper surface of the member 59 are ears 61, Fig. 8, between which is pivoted a pawl 62. A spring 63 tends to elevate end 64 of the pawl. As the member 59 moves forward toward the right, under the action of the lever 54, the end 64 of the pawl coacts with one of the links 65 of the chain belt 68 to which the buckets 12 are fixed. This coaction of the pawl with the link 65, causes the chain belt, and hence the buckets, to be operated by a step by step movement. The adjustment of the lever and the pin in the cam 51 is such that at each rotation of the disk 51, the buckets are moved toward the right a distance equivalent to seven buckets, and hence to the seven cones which form the block received from the baking machine. As the end of the lever 57 moves toward the left, the end 64 of the pawl is forced downwardly by the links 65 and no action of the conveyer results.

The clutch 46 is operated by means of a fork 70 fixed to a slidably mounted member 71. A spring 72 connects the member 71 with a pin 73 fixed to the frame of the machine, and thus the spring tends to throw the member 71, and hence the fork 70, toward the right and close the clutch 46. Fixed to the rock-shaft 74 is a finger 75, and fixed to the member 71 is a pin 76. When the rock-shaft is held in the position indicated in Figs. 1 and 2, the finger 75, by means of the pin 76, holds the member 71 to the left so that the clutch is open.

The rock-shaft holds the finger 75 normally in the position shown, but when the platform 28 moves into contact with the roller 37 the rock-shaft is released in the following described manner, and the clutch closes: A cam disk 77, fixed to the rock shaft 74, has a shoulder 78 against which the end 79 of the lever 80 bears, normally preventing rotation of the shaft 74, and hence preventing closing of the clutch. When, however, the rod 42 is moved to the right, by the action of the platform 28, the lower end of the lever 80, to which the rod 42 is pivoted, is moved to the right, and the end 79 is moved out of coaction with the shoulder 78 of the disk so that the rock-shaft is free to rotate under the action of the spring 72 and the spring forces the member 71 to the right and closes the clutch. A pin 81 fixed in the periphery of the disk 77 coming, as the disk rocks, in contact with the end 79, limits the movement of the disk.

The clutch is opened in the following manner: When the clutch is closed the worm gear 49 is operated by the worm 48; and the cam disk 51, fixed to the worm gear shaft 50, is rotated. The mechanism is so arranged that this disk makes at one time one complete rotation only, and in the direction of the arrow shown in Fig. 1. As the disk rotates a pin 82 fixed therein comes in contact with a finger 83 fixed to the rock-shaft 74. This causes the rock-shaft to be rotated during the time of contact of the pin and the finger sufficiently to allow the round end 79 of the lever 80 to pass the shoulder 78 of the disk 77; and spring 40, tending to return disk 38 to its original position, by means of the rod 42, forces the end 79 of the lever against the flattened surface 78 of the disk 77, forcing the rock-shaft 74 to rotate sufficiently to cause the finger 75 acting on the pin 76 to force the clutch 46 open. At the same time the pin 82 is rotated out of coaction with the finger 83. The lever 80 then holds the rock-shaft in position, and hence the clutch open, until the platform again releases the lever. It will thus be seen that the motion of the disk 51 is intermittent as it operates only when the clutch is closed. The movement of the platform 28, in the manner hereinabove explained causes the clutch to be closed; but one rotation of the disk 51 puts the mechanism in a position to open the clutch; so that the disk 51 makes one complete rotation and comes to rest, remaining so until another platform 28 again causes the clutch to be closed. Inasmuch as the disk 51 by its rotation operates the lever 54, and this lever operates the chain belt conveyer, the conveyer will be moved forward during the rotation of the disk 51 through a distance equal to seven buckets, and the conveyer will then remain at rest until the disk 51 is again rotated. This intermittent movement of the conveyer allows time for the block of cones to drop over onto the conveyer, for the preceding block to cool somewhat while resting in the intermediate position, and for the block at the right hand end of the conveyer to be properly trimmed and nested.

We will now consider the mechanism with reference to the trimming and nesting of the cones. Pivoted to the bottom of the frame is a lever 85, Fig. 3. A spring 86, fixed to the frame and to the lever 85, tends at all times to pull the upper end of the lever inwardly toward the machine. Pivoted to the upper end of the lever 85 is a connecting link 87 which connects the end of the lever with the plunger plate 16. Fixed to the plunger plate 16 are the guide bars 88 which are slidably mounted in the supports 89. A substantially horizontal lever 90 is pivoted at one end to the frame of the machine, and the other end is connected, by means of the connecting link 91 to the central portion of the vertical lever 85. Fitted near the central portion of the lever 90 is a roller 92. This roller rests against the cam surface 93 of the cam disk 51, the spring 86, acting through the levers, holding the roller 92 firmly in contact with this surface at all times. A consideration of this mechanism will show that, as the disk 51 rotates the spring 86 will be free to pull the upper end of the lever 85 inwardly; and one complete rotation of the disk will cause one complete reciprocation of the upper end of the lever. The inward movement of the upper end of the lever 85, and hence of the plunger plate 16, occurs while the block of cones 94 is at rest at the outer end of the conveyer, the small ends of the cones extending toward the trimming plate 15, as shown in Fig. 3. As the plunger plate 16 is forced inwardly toward the cones 94, the small ends of the cones are forced inwardly upon a guide 95, the slanting upper surface of which guides the ends of the cones into the apertures 14 of the trimming plate 15. The plunger plate 16 continuing in its movements forces the cones through the circular openings 14, separating the cones from each other and trimming the edges of the larger ends of the cones, and at the same time pressing the cones into the preceding set of cones 96 which lies on the shelf 17.

It becomes necessary for the guide plate 95 to be lowered after the small end of the cones have entered the apertures, as otherwise the large ends of the cones would be injured thereby. I have provided the following means for this purpose: The plate 95 is pivoted to ears 97 fixed to the frame of the machine, and a spring 98, fixed to the shelf 17 and to an arm 100, holds the plate 95 normally raised to the guiding position, the arm 100 being fixed to the plate 95. As the plunger plate 16 moves forward with the cones, the lower edge of the plate comes in contact with the lug 101 and forces downwardly the guide plate allowing the large ends of the cones to pass freely over. By these means I have provided for receiving the blocks of cones from the baking machine, allowing them sufficient time to cool, trimming and separating them properly, nesting them, and delivering them ready for packing. Attention is called to the fact that the intermittent action of the machinery allows time for the cooling of the cones while at rest rather than while in motion, and thus materially reduces the length of the conveyer required and at the same time increases the speed with which the cones may be transmitted. If the conveyer were continuous the motion would need to be much slower and the length much longer in order to give sufficient time for cooling. The temperature of the cones must be right or the separating, trimming and nesting will not be successfully carried out.

Although I have described with much particularity the details of the mechanism, which in this instance I have illustrated as embodying the features of my invention, yet it is to be understood that modifications in the mechanism could be made by those skilled in the art without departing from the spirit of my invention as set forth in the following claims.

I claim as my invention:

1. The combination of means for receiving blocks of cones, means for trimming the edges of said blocks, means for separating the cones of said blocks, and means for nesting said cones.

2. In an ice cream cone machine, means for separating and trimming cones, comprising a die, said die having apertures therethrough; means for delivering in a horizontal position a block of cones adjacent said die; means for elevating the small ends of said cones; and means for forcing said cones through said apertures.

3. In an ice cream cone machine, means for separating and trimming cones, comprising a die, said die having apertures therethrough; means for delivering in a horizontal position a block of cones adjacent said die; means for elevating the small ends of said cones; means for forcing said cones through said apertures, and means for depressing said elevating means.

4. The combination of means for receiving blocks of cones, means for trimming the edges of said blocks, and means for holding said blocks against said trimming means.

In testimony whereof, I hereunto set my hand.

SAMUEL E. WINDER.